United States Patent
Oksengendler et al.

(10) Patent No.: US 12,520,644 B2
(45) Date of Patent: Jan. 6, 2026

(54) INTEGRATED CONTROL MODULE FOR LED LIGHTING FIXTURE

(71) Applicant: ABL IP HOLDING, LLC, Conyers, GA (US)

(72) Inventors: Alex Oksengendler, Mundelein, IL (US); Yenpao Lu, Alpharetta, GA (US); Frank Pelliccio, Guilford, CT (US)

(73) Assignee: ABL IP Holding, LLC, Atlanta, GA (US)

( * ) Notice: Subject to any disclaimer, the term of this patent is extended or adjusted under 35 U.S.C. 154(b) by 108 days.

(21) Appl. No.: 18/239,444

(22) Filed: Aug. 29, 2023

(65) Prior Publication Data

US 2025/0081702 A1 Mar. 6, 2025

(51) Int. Cl.
| | |
|---|---|
| *H05B 45/305* | (2020.01) |
| *H01Q 21/06* | (2006.01) |
| *H05B 47/00* | (2020.01) |
| *H05B 47/105* | (2020.01) |
| *H10H 29/14* | (2025.01) |

(52) U.S. Cl.
CPC .......... *H10H 29/14* (2025.01); *H01Q 21/064* (2013.01); *H05B 45/305* (2020.01); *H05B 47/105* (2020.01)

(58) Field of Classification Search
CPC .... H10H 29/14; H05B 45/305; H05B 47/105; H01Q 21/064
See application file for complete search history.

(56) References Cited

U.S. PATENT DOCUMENTS

| | | | |
|---|---|---|---|
| 10,405,406 B2 | 9/2019 | Liszt | |
| 2016/0219671 A1* | 7/2016 | Maxik | F21V 23/006 |
| 2022/0373144 A1* | 11/2022 | Yeo | G02B 6/0036 |

FOREIGN PATENT DOCUMENTS

| | | | | |
|---|---|---|---|---|
| CN | 109510631 A | * | 3/2019 | H01Q 1/22 |
| DE | 602004005634 T2 | * | 12/2007 | H01Q 1/3291 |

* cited by examiner

*Primary Examiner* — Henry Luong
(74) *Attorney, Agent, or Firm* — Grossman, Tucker, Perreault & Pfleger, PLLC (57) ABSTRACT

A lighting fixture includes a frame; one or more Light Emitting Diode (LED) boards, each LED board containing a plurality of LED devices; and an integrated control module; and a plurality of connection screws, wherein the plurality of connection screws electrically couple the LED boards to the integrated control module.

19 Claims, 11 Drawing Sheets

INTEGRATED CONTROL MODULE FOR LED LIGHTING FIXTURE

TECHNICAL FIELD

The present application relates generally to lighting devices and, more particularly, to a Light Emitting Diode (LED) lighting device using an integrated control module.

BACKGROUND

Lighting devices based on LEDs are typically designed to run on low voltage (12-24V), direct current (DC) electricity. However, electricity is typically supplied in higher voltage (e.g., 120-277V) alternating current (AC) electricity. To run LEDs off the typical AC supply voltage, an LED driver is used. An LED driver is basically a power supply whose main purpose is to rectify higher voltage AC to low voltage DC. LED drivers also protect the LEDs from negative effects of fluctuations in voltage or current. LED light output is proportional to the supplied current, and LEDs are rated to operate within a certain current range. Too much or too little current can therefore cause light output to vary or degrade faster due to higher temperatures within the LED.

BRIEF DESCRIPTION OF THE DRAWINGS

Reference should be made to the following detailed description which should be read in conjunction with the following figures, wherein like numerals represent like parts.

DETAILED DESCRIPTION

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

LED lighting fixtures require a control device and an LED driver to provide stable power to the LED devices. The control device is required for communication to the fixture to allow for turning on and off the lighting fixture, dimming or brightening of the LED boards, and color control for the LED devices. LEDs require a driver to operate because they need a current controlled power source, meaning the current they receive must operate in a small range. Existing LED fixtures typically contain a separate control device and a driver. Integrating these components reduces cost and construction complexity.

Disclosed herein is a lighting fixture including an integrated control module for an LED fixture. The control module contains a control device, one or more sensors, and a driver on one PCB. The fully integrated control module also may include power delivery for the LED boards through screw terminals, eliminating remote wiring and connectors. In addition, spring clips may be used to hold down the LED boards within the lighting fixture. These spring clips allow for some expansion and contraction due to heat, while keeping the LED boards in place, and avoid the need to use conventional methods of securing the boards. The disclosed integrated control module may also include one or more embedded PCB slot antennas for wireless communication to the control device.

Figure 1:
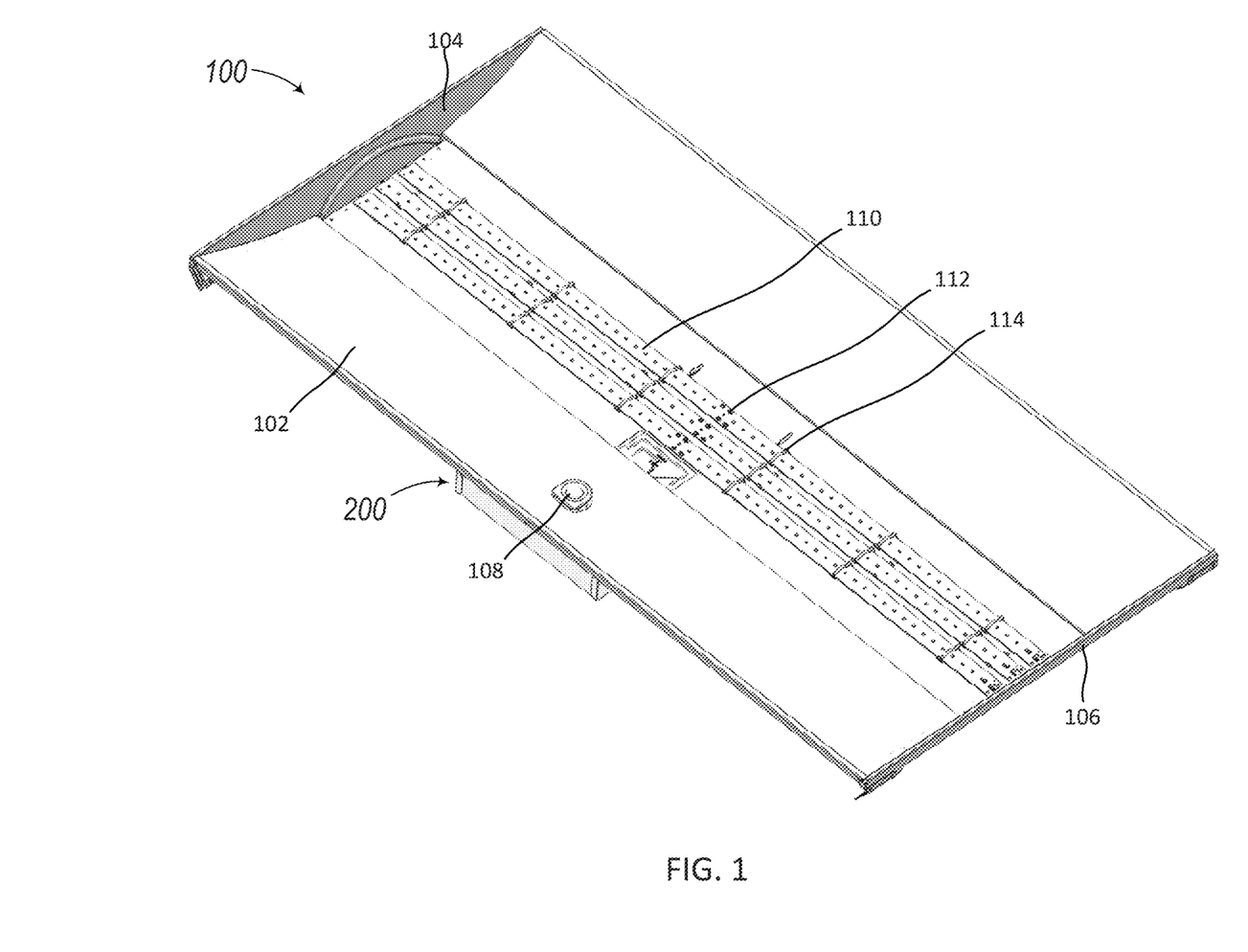
FIG. 1 is a bottom perspective view of a lighting fixture, consistent with the present disclosure.

FIG. 1 illustrates one example of a lighting fixture 100 configured in accordance with an embodiment of the present disclosure. The lighting fixture 100 may include a frame 102 coupled to a first end plate 104 disposed on a first end of frame 102 and a second end plate 106 disposed on a second, opposing end of frame 102. When combined, frame 102, first end plate 104, and second end plate 106 comprise an enclosure for the lighting fixture. In an embodiment, the first end plate 104 and the second end plate 106 may be the same. The lighting fixture 100 also includes integrated control module 200, sensor cover 108, one or more LED boards 110, a plurality of spring clips 114 to couple the LED boards 110 to the frame 102, and a plurality of electrical connection screws 112. The connection screws 112 electrically couple to LED driver circuitry in the integrated control module 200 to power delivery circuitry in the LED boards, thereby eliminating the need for wired connections for power distribution to the LED boards 110.

Figure 2:
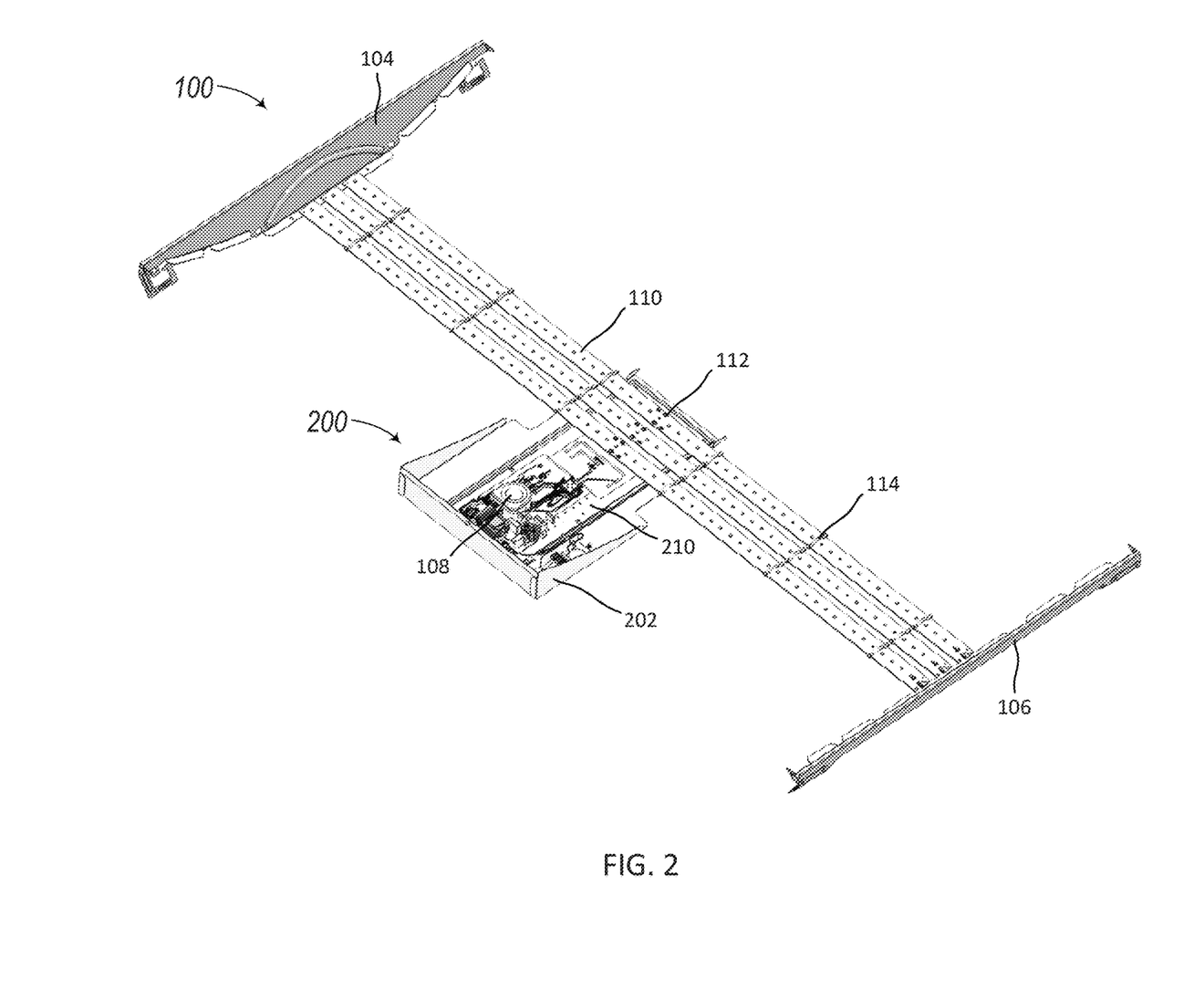
FIG. 2 is a bottom perspective view of the lighting fixture of FIG. 1, with the frame hidden, consistent with the present disclosure.

FIG. 2 is a bottom perspective view of the lighting fixture of FIG. 1, with the frame 102 removed, in accordance with an embodiment of the present disclosure. As shown in FIG. 2, the integrated control module 200 includes a control module PCB assembly 210. The components of the integrated control module 200 are housed in control module enclosure 202.

Figure 3:
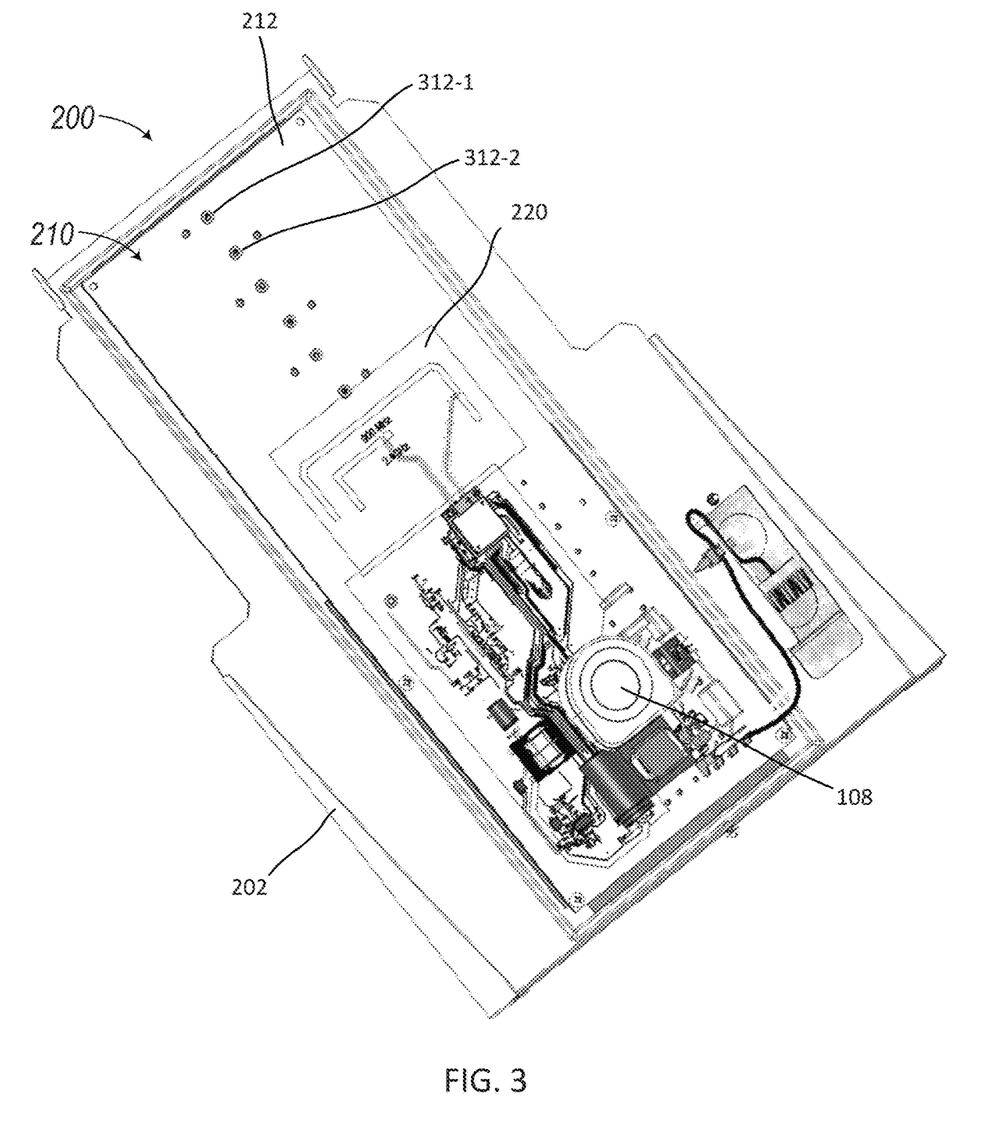
FIG. 3 is a perspective view showing the position of the integrated control module on the frame of the lighting fixture of FIG. 1, consistent with the present disclosure.

FIG. 3 is a perspective view of an integrated control module 200 for the lighting fixture of FIG. 1, consistent with the present disclosure. As shown in FIG. 3, the integrated control module 200 includes control module PCB 212, which contains control circuitry as well as LED driver circuitry. Power is coupled to the LED boards 110 by the screw terminals 312-1 and 312-2, which may be electrically coupled to the LED driver circuitry. In an embodiment, screw terminal 312-1 may be configured to supply DC power, while screw terminal 312-2 may be configured to couple to an electrical ground to complete the power circuit. In another embodiment, screw terminal 312-2 may be configured to supply DC power, while screw terminal 312-1 may be configured to couple to an electrical ground to complete the power circuit.

Figure 4:
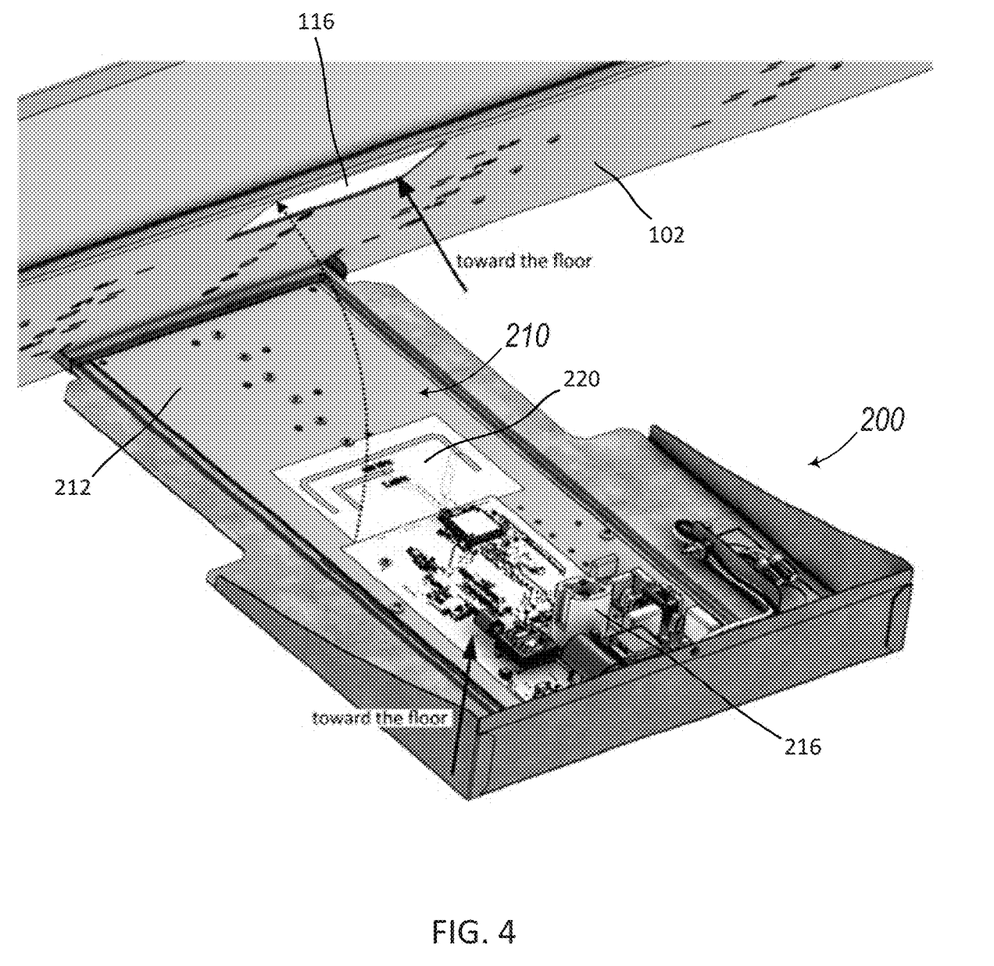
FIG. 4 is a perspective view of an integrated control module for the lighting fixture of FIG. 1, consistent with the present disclosure.

FIG. 4 is a perspective view showing the position of the integrated control module 200 on the frame of the lighting fixture of FIG. 1, consistent with the present disclosure. As shown in FIG. 4, the integrated control module 200 is disposed on a top surface of the frame 102 (it should be noted that the frame 102 is shown in FIG. 3 with the top surface facing down, to better illustrate the position of the integrated control module 200). The frame 102 includes window 116, which is disposed opposite the embedded PCB slot antenna 220. The window 116 allows the embedded PCB slot antenna 220 to transmit and/or receive RF energy without any obstruction. The control module enclosure 202 also includes a window (not shown), which is disposed opposite a back side of the embedded PCB slot antenna 220. The window disposed opposite the back side of the embedded PCB slot antenna 220 allows the embedded PCB slot antenna 220 to transmit and/or receive RF energy without any obstruction on the opposite side of the luminaire from the window 116.

A traditional slot antenna consists of a metal surface, usually a flat plate, with one or more holes or slots cut out. When the plate is driven as an antenna by an applied radio frequency current, the slot radiates electromagnetic waves. An embedded PCB antenna is an antenna fabricated using photolithographic techniques to etch copper structures on a PCB. The embedded PCB slot antenna 220 disclosed herein is a slot antenna disposed directly on the control module PCB 212.

The use of the embedded PCB slot antenna 220 as an integral part of the control module PCB 212 has several advantages. First, the embedded PCB slot antenna 220 does not require an electrical connection to the sheet metal of frame 102. Second, the embedded PCB slot antenna 220 will not get de-tuned by the sheet metal nor will its pattern get severely distorted like it would with a traditional PCB antenna. Finally, the embedded PCB slot antenna 220 does not require new FCC certifications for every fixture in which the integrated control module 200 is used, since the radiating element of the embedded PCB slot antenna 220 is on the control module PCB 212, and not the fixture.

Also shown in FIG. 4 is sensor 216. In an embodiment, sensor 216 may be an ambient light sensor to detect ambient light levels and enable automatic dimming or brightening of the lighting fixture 100. In an embodiment, sensor 216 may be a motion detector to detect occupancy in areas covered by the sensor and to turn on fixture based on that motion.

Figure 5:
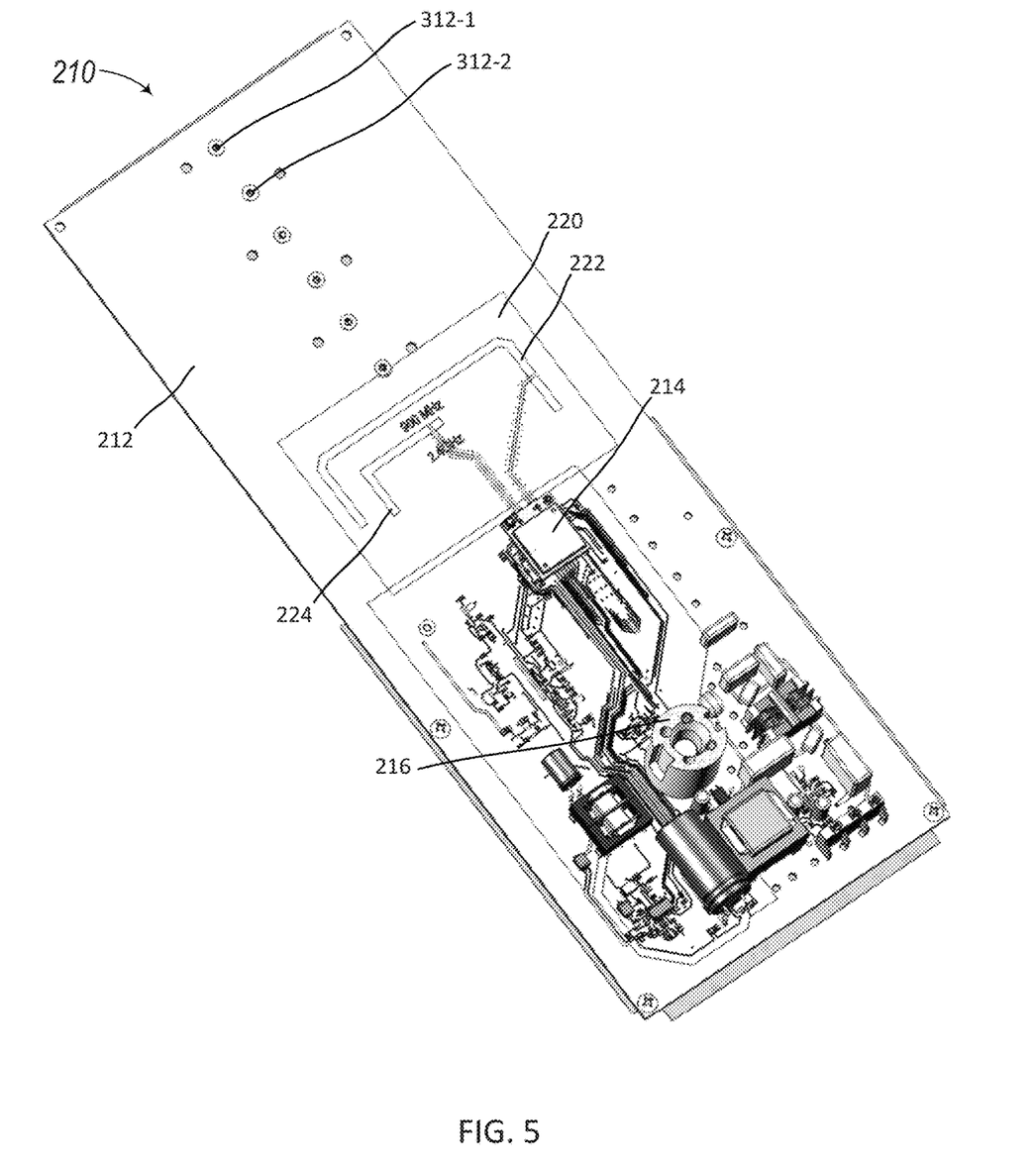
FIG. 5 is a top perspective view of the control module Printed Circuit Board (PCB), consistent with the present disclosure.

FIG. 5 is a top perspective view of the control module PCB assembly 210, consistent with the present disclosure. As shown in FIG. 5, control module PCB assembly 210 includes control circuitry 214, which may be, for example, a controller, the sensor 216 and the LED driver circuitry, which may include an LED driver, on one PCB. Control circuitry 214 is the circuitry that controls all functions of the lighting fixture 100, including, but not limited to, turning the fixture on or off, dimming the LEDs, brightening the LEDs, communicating with external devices, such as building automation systems, etc. Existing LED fixture contain a separate control device and a driver. LEDs require a driver to operate because they need a current controlled power source, meaning the current they receive must operate in a small range. Integrating these components reduces cost and construction complexity.

Figure 6:
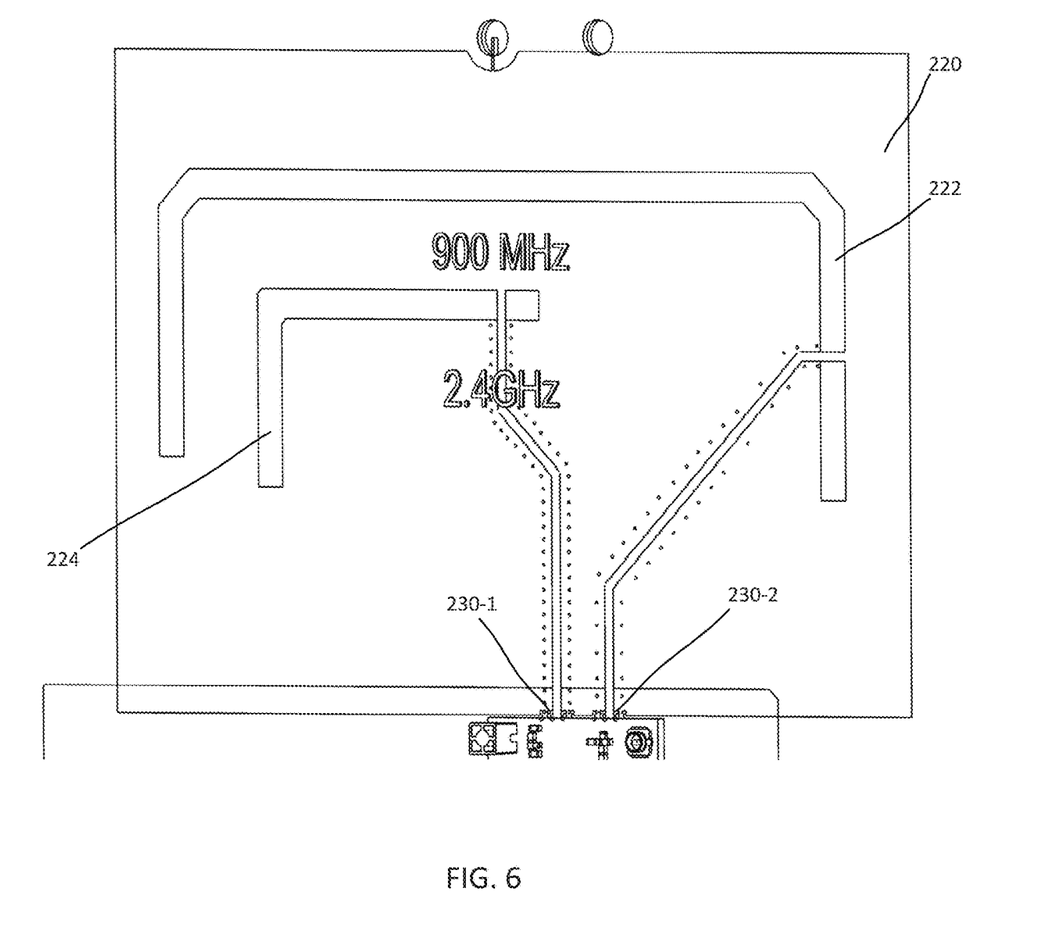
FIG. 6 is a detail view of an embedded PCB slot antenna on the control module PCB, consistent with the present disclosure.

FIG. 6 is a detail view of an example embedded PCB slot antenna 220 on the control module PCB 212, consistent with the present disclosure. The example embedded PCB slot antenna 220 of FIG. 6 includes two separate antennas, one for each of two different frequencies, but any number of separate antennas may be incorporated in the embedded PCB slot antenna 220. First antenna 222 in this example is configured to transmit and/or receive at a frequency of 900 megahertz (MHz), while second antenna 224 is configured to transmit and/or receive at a frequency of 2.4 gigahertz (GHz). In other embodiments, the antennas may be configured to transmit and/or receive at any other frequencies.

Also shown in FIG. 6 are RF connection 230-1 and RF connection 230-2, which couple the first antenna 222 and the second antenna 224 to the control circuitry on the control module PCB assembly 210. In the example of FIG. 6, RF connection 230-1 couples the second antenna 224 to the control circuitry, and RF connection 230-2 couples the first antenna 222 to the control circuitry.

Figure 7:
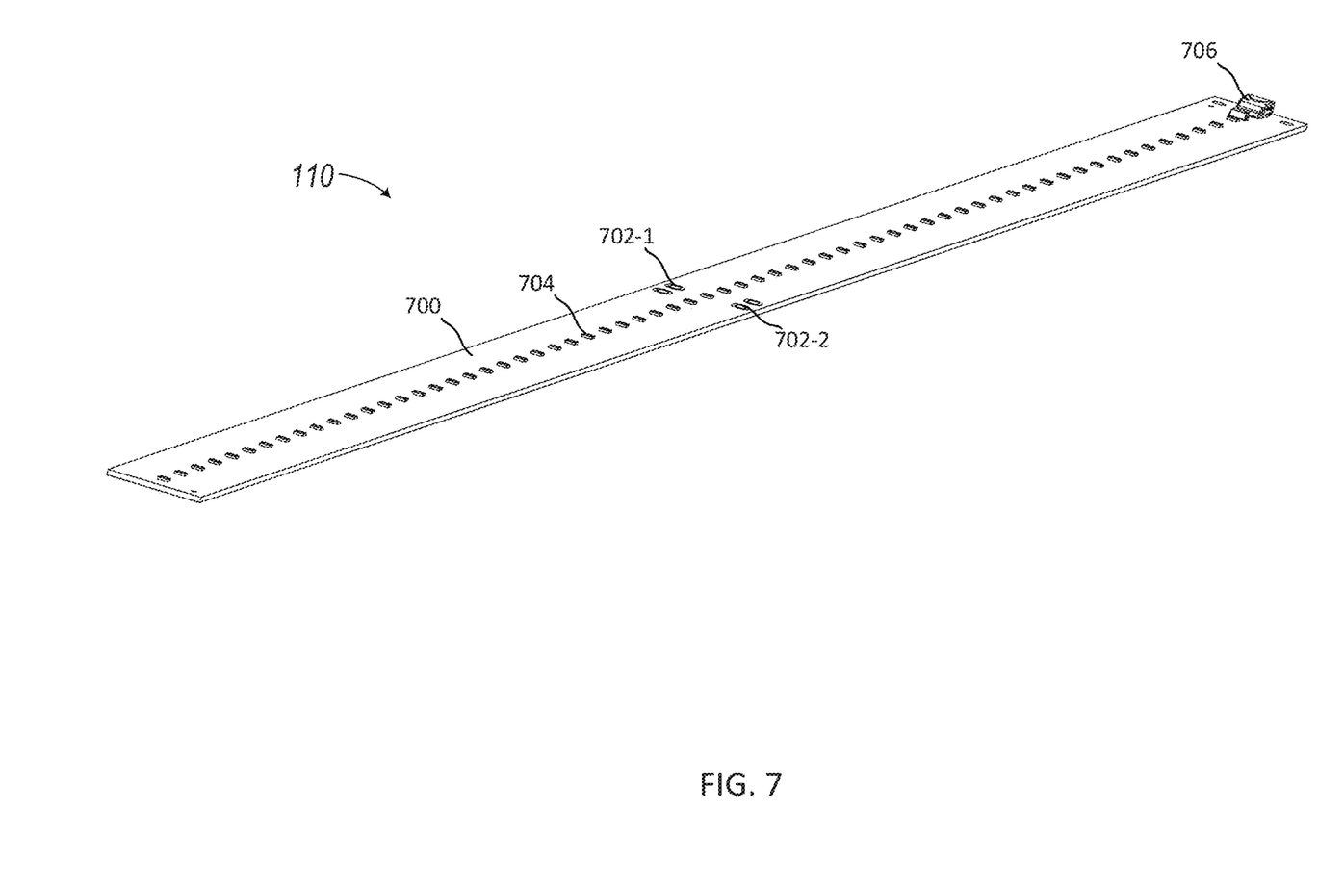
FIG. 7 is a top perspective view of an LED board, consistent with the present disclosure.

FIG. 7 is a top perspective view of an LED board 110, consistent with the present disclosure. The LED board 110 includes LED PCB 700 and a plurality of LEDs 704 electrically coupled to the LED board 110. The LED PCB 700 is configured to supply power to the LEDs 704 from the LED driver circuitry in the integrated control module 200. Power from the integrated control module 200 is coupled through the power contacts 702-1 and 702-2 to LED PCB 700, which distributes the power to the individual LEDs 704. In an embodiment, power contacts 702-1 may couple DC power to the LED PCB 700 and power contacts 702-2 may provide a ground connection to the LED PCB 700. In another embodiment, power contacts 702-2 may couple DC power to the LED PCB 700 and power contacts 702-1 may provide a ground connection to the LED PCB 700. In other embodiments, any power contact may be configured to couple power or ground, as would be known to one skilled in the art.

In an embodiment, the LED board 110 may include connector 706, which may be, for example, a power connector for alternative power distribution.

Figure 8:
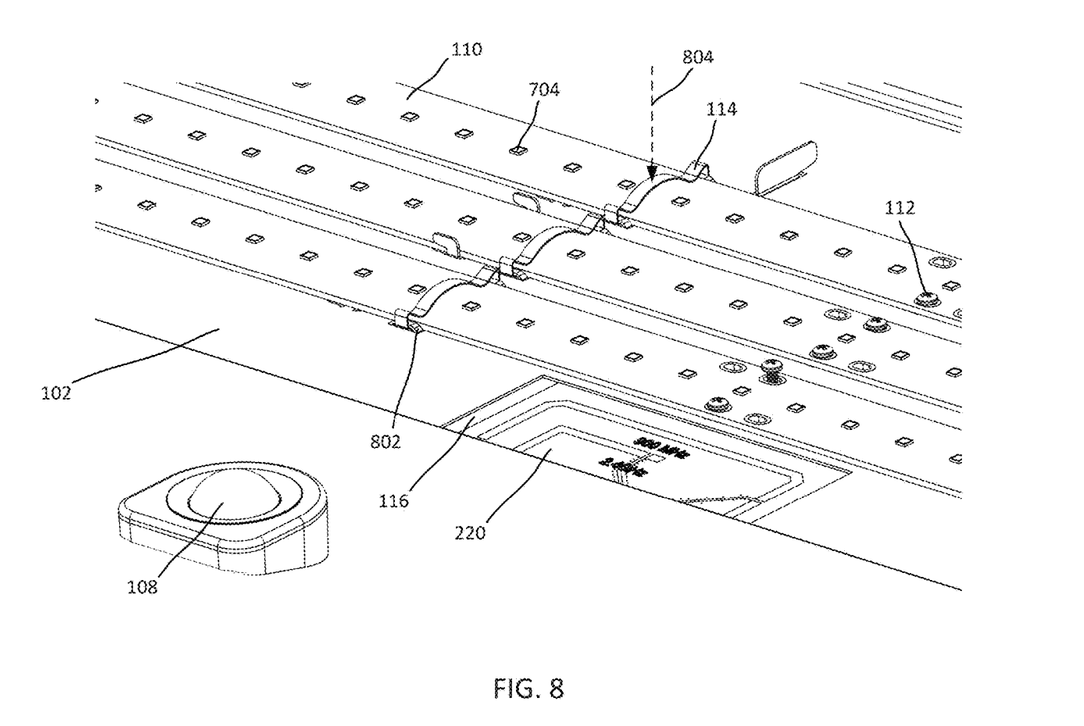
FIG. 8 is a detail view showing mounting the LED boards in the lighting fixture of FIG. 1, consistent with the present disclosure.

FIG. 8 is a detail view showing mounting the LED boards 110 in the lighting fixture 100 of FIG. 1, consistent with the present disclosure. In the detail of FIG. 8, three LED boards 110 are coupled with the frame 102 of lighting fixture 100 by a plurality of spring clips 114. While the example of FIG. 8 shows three LED boards 110 in lighting fixture 100, any number of LED boards 110 may be included in lighting fixture 100. The spring clips 114 allow for some expansion and contraction due to heat, while keeping the LED boards 110 in place, while avoiding the use of conventional methods of securing the LED boards 110. The spring clips 114 are disposed on a top surface of LED board 110, and couple to the frame 102 via raised protrusions 802 formed in the frame 102 and disposed on either side of the LED board 110. When coupled with the raised protrusions 802, the shape of the spring clips 114 is configured to apply a downward force 804 substantially perpendicular to the top surface of the LED board 110. As discussed above, the LED boards 110 are electrically coupled with the control module PCB assembly 210 by connection screws 112.

Figure 9A:
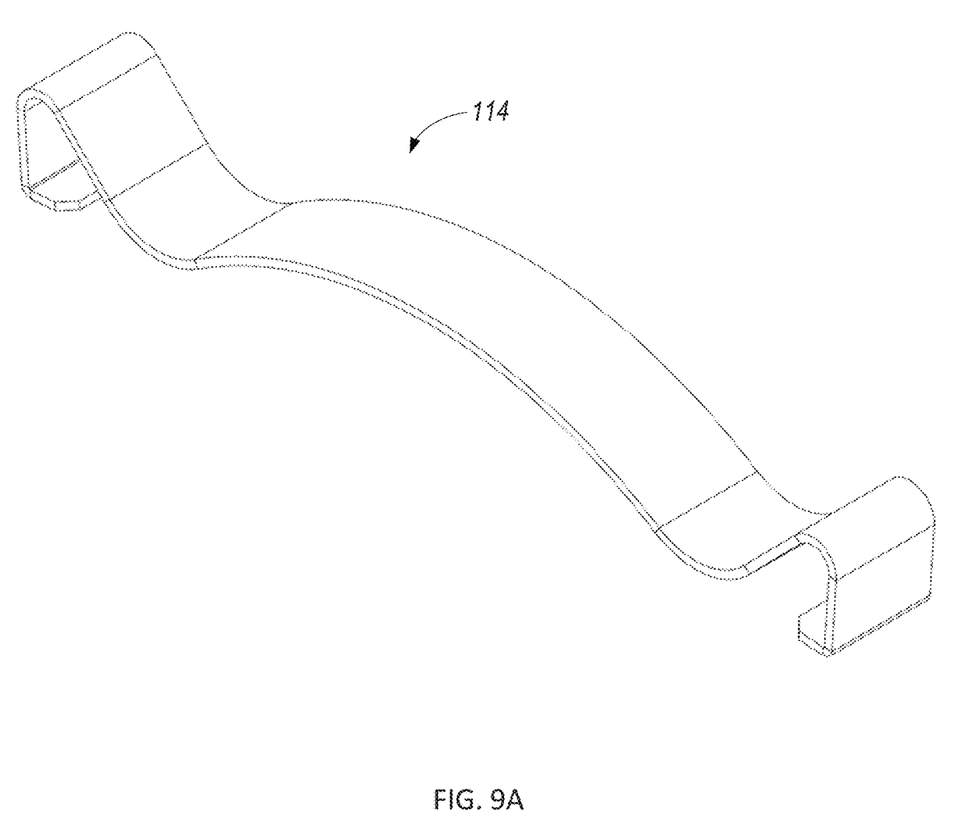
FIG. 9A is a top perspective view of a spring clip for mounting the LED boards in the lighting fixture, consistent with the present disclosure.
Figure 9B:
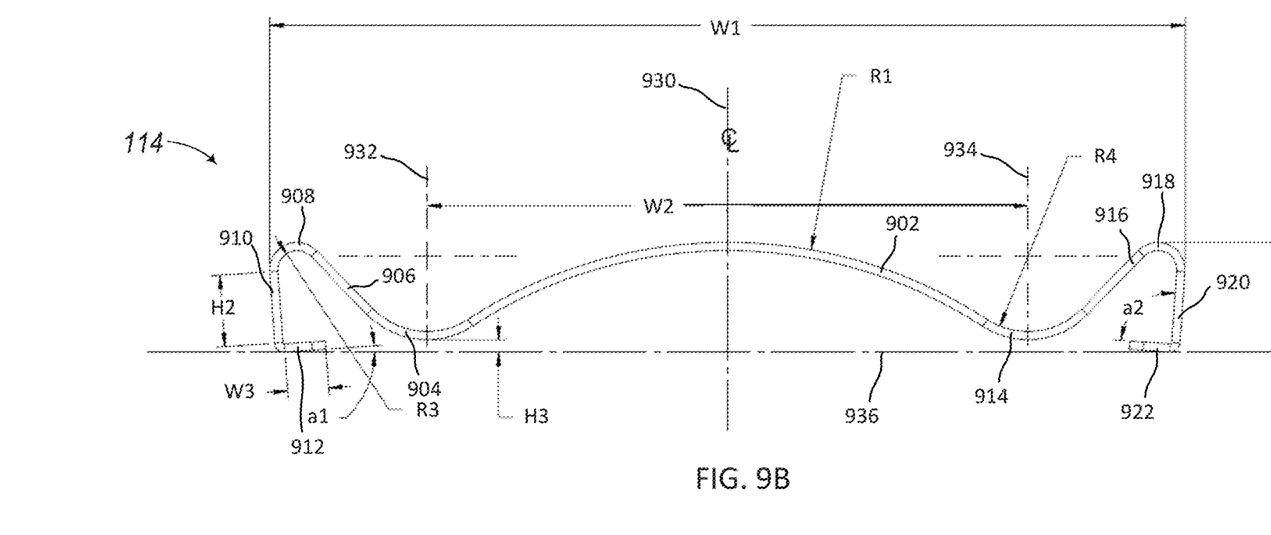
FIG. 9B is a side view of the spring clip of FIG. 9A, consistent with the present disclosure.
Figure 9C:
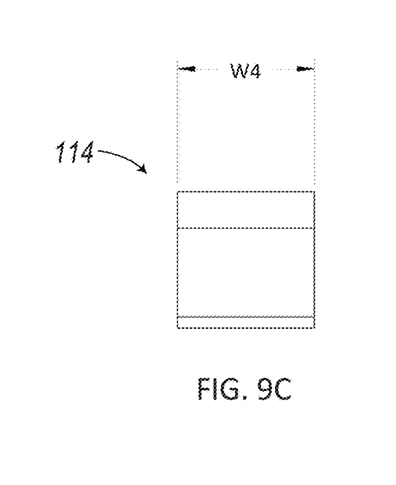
FIG. 9C is an end view of the spring clip of FIG. 9A, consistent with the present disclosure.

FIG. 9A is a top perspective view, FIG. 9B is a side view, and FIG. 9C is an end view of a spring clip 114 for mounting the LED boards 110 in the lighting fixture, consistent with the present disclosure. The spring clip 114 has a top surface 902 that may curve with a radius of R1, which may be, for example, 17.5 mm. The height H1 of the tab 912 may be configured to accommodate various types, widths, and thicknesses of the LED board 110. The top surface 902 extends to a first inflection point, and a first transition region 904. First transition region 904 may curve with a radius of R2, which may accommodate various geometries of the LED board 110, and may be, for example, 2.75 mm. The first transition region 904 may have a height H3 relative to the horizontal plane 936, which may be, for example, 0.45 mm. The first transition region 904 extends to a second inflection point, and a second transition region 906. The width W2 between a centerline 932 of the first transition region 904 and a centerline 934 of fourth transition region 914 may be, for example, 22.00 mm.

The second transition region 906 extends to a third inflection point, and a third transition region 908. The third transition region 908 may curve with a radius of R3, which may be, for example, 0.70 mm. The third transition region 908 has a height of H2 relative to a bottom surface of the first tab 912, The third transition region 908 extends to a fourth inflection point, and a first side 910. The first side 910 has a height of H2 which may be, for example, 2.6 mm.

The first side 910 extends to the first tab 912, which is disposed at an angle a2 from first side 910 inwardly towards a centerline 930 of top surface 902. Angle a2 may be, for example, 90 degrees. The first tab 912 is also disposed at an angle a1 relative to a horizontal plane 936. Angle a1 may be, for example, 4 degrees.

The first tab 912 is configured to couple with a bottom surface of the raised protrusion 802 of the frame 102, thereby coupling the LED board 110 to the frame 102.

The top surface 902 also extends to a fifth inflection point, and a fourth transition region 914. Fourth transition region 914 may curve with a radius of R4, which may accommodate various geometries of the LED board 110, and may be, for example, 2.75 mm. The fourth transition region 914 extends to a sixth inflection point, and a fifth transition region 916. The fifth transition region 916 extends to a seventh inflection point, and a sixth transition region 918. The sixth transition region 918 may curve with a radius of R3. The sixth transition region 918 extends to an eighth inflection point, and a second side 920. The second side 920 extends to the second tab 922, which is disposed substantially at the angle a2 from second side 920 inwardly towards the centerline 930 of top surface 902. The second tab 922 is configured to couple with a bottom surface of the raised protrusion 802 of the frame 102, thereby coupling the LED board 110 to the frame 102.

In an embodiment, the spring clip 114 may be substantially symmetrical about a vertical axis shown by centerline 930 disposed in the center of top surface 902. In this embodiment, therefore, radius R2 may be substantially equal to radius R4, radius R3 may be substantially equal to radius R5, first transition region 904 may be substantially equivalent to fourth transition region 914, second transition region 906 may be substantially equivalent to fifth transition region 916, third transition region 908 may be substantially equivalent to sixth transition region 918, first side 910 may be substantially equivalent to second side 920, and first tab 912 may be substantially equivalent to second tab 922.

The spring clip 114 has a width W1 referenced from an outer edge of first side 910 and a corresponding outer edge of a second side 920, which may be, for example, 33.50 mm. In an embodiment, the spring clips 114 may be manufactured of spring steel. In other embodiments, the spring clips 114 may be manufactured of any similar materials including non-metal materials with provided spring-type characteristics.

FIG. 9C is an end view of the spring clip 114 of FIG. 9A, consistent with the present disclosure. In the end view of FIG. 9C, the width W4 of the spring clip 114, which may be, for example, 4.00 mm.

Figure 10:
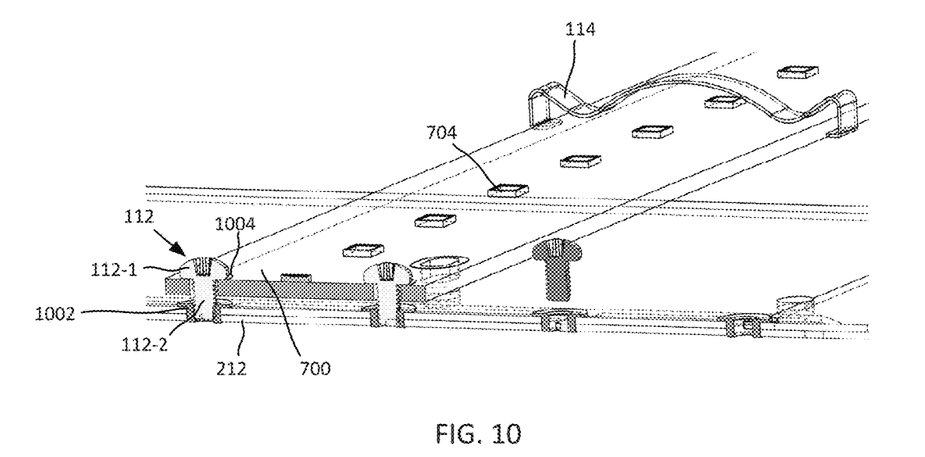
FIG. 10 is a cross-sectional view showing the connection screws for power distribution, consistent with the present disclosure.

FIG. 10 is a cross-sectional view showing an example of the connection screws 112 coupling the LED boards 110 to the power distribution circuitry, consistent with the present disclosure. In the example shown in FIG. 10, connection screw 112 has been inserted through LED PCB 700 and into screw terminal 1002, which may be, for example, screw terminal 312-1 or screw terminal 312-2 from FIG. 3. When connection screw 112 is fully inserted, screw head 112-1 is electrically coupled to power contact 1004 on the LED board 110. The power contact 1004 may be, for example, power contact 702-1 or power contact 702-2 from FIG. 7. The screw body 112-2 is also electrically coupled to screw terminal 1002 of control module PCB 212. The screw terminal 1002 may be, for example, screw terminal 312-1 or screw terminal 312-2 from FIG. 3. In this way the DC power from the LED driver circuitry in the integrated control module 200 is coupled to the LED board 110 without requiring a separate power connection.

Figure 11:
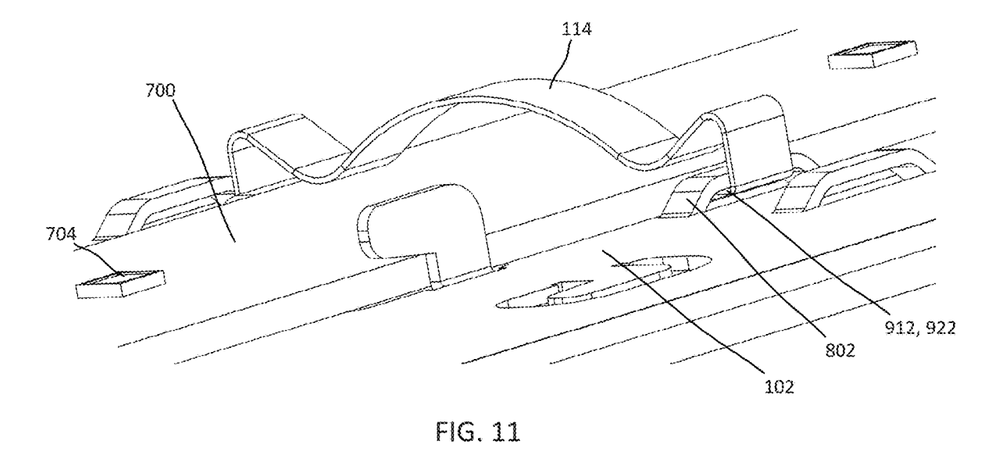
FIG. 11 is a detail view showing the attachment of the spring clips to mount the LED boards, consistent with the present disclosure.

FIG. 11 is a detail view showing the attachment of the spring clips 114 to mount the LED boards 110. In the detail view of FIG. 11, the coupling of the first tab 912 or the second tab 922 to the lower surface of the raised protrusion 802 of the frame 102 is clearly illustrated.

According to one aspect of the disclosure there is thus provided a lighting fixture, the lighting fixture including: a frame; one or more Light Emitting Diode (LED) boards, each LED board containing a plurality of LED devices; and an integrated control module; and a plurality of connection screws, wherein the plurality of connection screws electrically couples the LED boards to the integrated control module.

According to another aspect of the disclosure there is thus provided an integrated control module for a lighting fixture, the integrated control module including: a control module Printed Circuit Board (PCB), the PCB including: control circuitry for one or more Light Emitting Diode (LED) boards, each LED board containing a plurality of LED devices; LED driver circuitry; and power delivery circuitry for the one or more LED boards.

According to yet another aspect of the disclosure there is thus provided a lighting fixture, the lighting fixture comprising: a frame; one or more Light Emitting Diode (LED) boards, each LED board containing a plurality of LED devices; a plurality of spring clips configured to couple the one or more LED boards to the frame; and an integrated control module, the integrated control module including: a control module printed circuit board (PCB); LED driver circuitry; power delivery circuitry for the one or more LED boards; a plurality of connection screws configured to couple the LED boards to the LED driver circuitry; an embedded PCB slot antenna disposed on the control module PCB; and control circuitry for one or more LED boards, the control circuitry configured to: communicate with external devices to allow for turning on and off the lighting fixture, dimming or brightening of the LED boards, and color control for the LED devices.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry," as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A lighting fixture, the lighting fixture comprising:
   a frame;
   a plurality of Light Emitting Diode (LED) boards coupled to the frame, each LED board including:
      a LED Printed Circuit Board (PCB); and
      one or more LEDs electrically coupled to the LED PCB;
   an integrated control module; and
   a plurality of connection screws configured to electrically couple the LED PCBs to the integrated control module.

2. The lighting fixture of claim 1, wherein the integrated control module further comprises:
   control circuitry;
   LED driver circuitry;
   a plurality of screw terminals configured to receive a corresponding connection screw to couple Direct Current (DC) power from the LED driver circuitry to a corresponding LED PCB;
   an embedded PCB slot antenna; and
   one or more sensors.

3. The lighting fixture of claim 2, wherein the one or more sensors include at least one of an ambient light sensor to detect ambient light levels and enable automatic dimming or brightening of the lighting fixture or a motion detector to detect motion and to turn on fixture based on the detected motion.

4. The lighting fixture of claim 2, further comprising:
   a first window in the frame disposed opposite the embedded PCB slot antenna; and
   a second window in a control module enclosure disposed opposite the embedded PCB slot antenna, wherein the first window and the second window allow the PCB slot antenna to transmit and/or receive RF energy without any obstruction.

5. The lighting fixture of claim 2, wherein the embedded PCB slot antenna further comprises a first antenna and a second antenna.

6. The lighting fixture of claim 5, wherein the first antenna is configured to transmit and/or receive at a first frequency of 900 megahertz (MHz) and the second antenna is configured to transmit and/or receive at a second frequency of 2.4 gigahertz (GHz).

7. The lighting fixture of claim 2, further comprising one or more spring clips configured to couple the LED board to the frame.

8. The lighting fixture of claim 7, wherein:
   the one or more spring clips are disposed on a top surface of the LED board and couple to the frame via raised protrusions formed in the frame disposed on either side of the LED board; and
   a shape of the plurality of spring clips are configured to apply a downward force substantially perpendicular to the top surface of the LED board.

9. The lighting fixture of claim 7, wherein the one or more spring clips are configured to allow for expansion and contraction due to heat while keeping the LED board in place.

10. The lighting fixture of claim 7, wherein the LED PCB includes:
   one or more power contacts configured to couple the DC power from the LED driver circuitry in the integrated control module to the one or more of LEDs.

11. A lighting system comprising:
   a Light Emitting Diode (LED) board including:
      a LED Printed Circuit Board (PCB); and
      a LED electrically coupled to the LED PCB; and
   a control module PCB, the control module PCB including:
      control circuitry configured to control operation of the LED; and
      an embedded PCB slot antenna configured to transmit and receive RF energy.

12. The lighting system of claim 11, wherein the embedded PCB slot antenna further comprises a first antenna and a second antenna.

13. The lighting system of claim 12, wherein the first antenna is configured to transmit and receive at a first frequency of 900 megahertz (MHz).

14. The lighting system of claim 13, wherein the second antenna is configured to transmit and receive at a second frequency of 2.4 gigahertz (GHz).

15. The lighting system of claim 11, further comprising one or more sensors.

16. The lighting system of claim 15, wherein the one or more sensors include at least one of an ambient light sensor to detect ambient light levels and enable automatic dimming or brightening of the lighting fixture or a motion detector to detect motion and to turn on fixture based on the detected motion.

17. The lighting system of claim 11, wherein the control module PCB further comprises:
   a screw terminal configured to couple DC power from the LED driver circuitry in the integrated control module to the one or more LED boards.

18. The lighting system of claim 11, wherein the control circuitry is configured to:
   communicate with external devices to allow for one or more of turning on and off the LED, dimming or brightening of the LED, or color control for the LED.

19. A lighting fixture, the lighting fixture comprising:
   a frame;
   a Light Emitting Diode (LED) board coupled to the frame, the LED board includes:
      a LED Printed Circuit Board (PCB); and
      a LED electrically coupled to the LED PCB; and
   an integrated control module, the integrated control module including:
      LED driver circuitry; and
      a screw terminal configured to receive a connection screw that is configured to electrically couple the LED PCB to the LED driver circuitry such that power from the LED driver circuitry is provided to the LED.

\* \* \* \* \*